(12) United States Patent
Bathelier et al.

(10) Patent No.: US 11,180,093 B2
(45) Date of Patent: Nov. 23, 2021

(54) SOUND PROOFING PART FOR AN AUTOMOTIVE VEHICLE AND RELATED MANUFACTURING PROCESS

(71) Applicant: FAURECIA AUTOMOTIVE INDUSTRIE, Nanterre (FR)

(72) Inventors: Xavier Bathelier, Saint Pierremont (FR); Valerie Marcel, Brandeville (FR)

(73) Assignee: FAURECIA AUTOMOTIVE INDUSTRIE, Nanterre (FR)

(*) Notice: Subject to any disclaimer, the term of this patent is extended or adjusted under 35 U.S.C. 154(b) by 614 days.

(21) Appl. No.: 16/043,987

(22) Filed: Jul. 24, 2018

(65) Prior Publication Data
US 2019/0023197 A1    Jan. 24, 2019

(30) Foreign Application Priority Data
Jul. 24, 2017 (FR) ...................... 17 57001

(51) Int. Cl.
| | | |
|---|---|---|
| B60R 13/08 | (2006.01) |
| G10K 11/168 | (2006.01) |
| B32B 3/26 | (2006.01) |
| B32B 5/02 | (2006.01) |
| B32B 5/18 | (2006.01) |

(52) U.S. Cl.
CPC .......... *B60R 13/0815* (2013.01); *B32B 3/266* (2013.01); *B32B 5/022* (2013.01); *B32B 5/18* (2013.01); *B60R 13/083* (2013.01); *G10K 11/168* (2013.01); *B32B 2305/022* (2013.01); *B32B 2307/102* (2013.01); *B32B 2605/00* (2013.01)

(58) Field of Classification Search
CPC ... B60R 13/0815; B60R 13/083; B32B 3/266; B32B 5/022; B32B 5/18; B32B 2305/022; B32B 2307/102; B32B 2605/00; G10K 11/168
USPC ......................................... 181/290
See application file for complete search history.

(56) References Cited

U.S. PATENT DOCUMENTS

| 3,966,526 A | * | 6/1976 | Doerfling ............ B60R 13/0225 |
| | | | 156/224 |
| 4,263,356 A | | 4/1981 | Nomura et al. |
| 6,820,720 B1 | | 11/2004 | Nicolai et al. |
| 6,951,264 B2 | | 10/2005 | Byma et al. |
| 2005/0178489 A1 | * | 8/2005 | Belleguic ............. G10K 11/172 |
| | | | 156/64 |

(Continued)

FOREIGN PATENT DOCUMENTS

| EP | 2949446 A1 | 12/2015 |
| WO | WO2009019220 A1 | 2/2009 |

OTHER PUBLICATIONS

French Search Report for application No. FR 1757001, dated Jan. 16, 2018, 2 pages.

*Primary Examiner* — Forrest M Phillips
(74) *Attorney, Agent, or Firm* — Reising Ethington P.C.

(57) ABSTRACT

A motor vehicle soundproofing part includes a base body made from foam or felt and a surface layer, applied on the base body. The base body has shaping reliefs and the surface layer includes a plurality of through perforations and airtight regions between the perforations. Each perforation has a transverse dimension smaller than 1.5 mm, advantageously smaller than 1 mm and, in particular, between 0.1 mm and 0.5 mm.

19 Claims, 4 Drawing Sheets

(56) References Cited

U.S. PATENT DOCUMENTS

2015/0306815 A1* 10/2015 Braden .................. B23B 35/00
                                                    156/272.8
2017/0036964 A1*  2/2017 Ducharlet ............. C04B 35/565
2017/0225430 A1*  8/2017 Langiny .............. B29C 44/1285
2018/0050735 A1*  2/2018 Jaunasse ............... B60R 13/083
2019/0329360 A1* 10/2019 Reeves ............. B23K 26/0624

* cited by examiner

SOUND PROOFING PART FOR AN AUTOMOTIVE VEHICLE AND RELATED MANUFACTURING PROCESS

BACKGROUND OF THE INVENTION

Field of the Invention

The present invention relates to a soundproofing part for a motor vehicle, comprising:
- a base body made from foam or felt, the base body having shaping reliefs; and
- a surface layer, applied on the base body, the surface layer including a plurality of through perforations and airtight regions between the perforations.

The soundproofing part is in particular intended to form all or part of a soundproofing component of a motor vehicle.

The component is intended to resolve the acoustic problems that arise in a substantially closed space, such as the passenger compartment of the motor vehicle (floor, roof, fire wall, etc.), near noise sources such as an engine, pneumatic contact with a road, etc.

Description of Related Art

In general, in the low frequency domain, the acoustic waves created by the aforementioned noise sources undergo a "damping" by materials in the form of single or double sheets (pre-stressed sandwich) having a viscoelastic behavior or by acoustic attenuation of a porous and elastic mass-spring system.

Within the meaning of the present invention, a soundproofing assembly provides "insulation" when it prevents the entry of medium and high frequency acoustic waves into the soundproofed space, essentially by reflecting waves toward the noise sources or the outside of the soundproofed space.

A soundproofing assembly operates by "sound absorption" (in the medium and high frequency field) when the energy from the acoustic waves dissipates in an absorptive material.

A high-performance soundproofing assembly must work both by providing good insulation and good absorption. To characterize the performance of such an assembly, the notion of noise reduction (NR) index is used, which takes into account the notions of insulation and absorption. This index can because related using the following equation:

$$NR(dB) = TL - 10 \log(S/A),$$

where TL is the sound transmission loss index (hereinafter referred to as the loss index) reflecting the insulation. The higher this index is, the better the insulation is.

A is the equivalent absorption surface. The higher A is, the better the absorption is. S is the surface area of the assembly.

The soundproofing assemblies used in motor vehicles generally comprise a porous base body, such as a layer of open-cell foam, or a layer of felt.

The base body is sometimes associated with other layers, in order to improve the absorption or insulation properties. These layers are in particular layers with a heavy mass in order to increase the insulation, and/or nonwoven layers to increase the absorption.

The use of a nonwoven with a high resistance to the passage of air on a layer of felt or a porous layer makes it possible to produce a by permeable complex having a wideband absorption. The nonwoven is, however, expensive.

Furthermore, making the layer of foam by foaming in a mold frequently leads to forming a tight surface layer on the base body, in contact with the walls of the mold.

Such a tight layer is detrimental to the desired absorption performance, since it generates sound waves that are transmitted through the skeleton of the foam. Furthermore, the tight layer makes the use of a nonwoven ineffective.

To offset this problem, it is known to arrange a stripping agent in the foaming mold on the wall of the mold. Additives present in the stripping agent react with the precursor material of the foam, preventing skin from forming.

Such a method is not fully satisfactory. Indeed, the additives are generally made up with a base of solvents and therefore generate volatile organic compounds that are harmful to one's health. They are also prohibited in many production countries.

Furthermore, the addition of a nonwoven requires an additional process step, which, combined with the material cost of the nonwoven, significantly increases the production cost of the part.

SUMMARY

One aim of the invention is to obtain a very effective soundproofing part, the part having a complex shape adapted to the inside of a motor vehicle, while being inexpensive and safe to manufacture.

To that end, the invention relates to a soundproofing part of the aforementioned type, characterized in that each perforation has a transverse dimension smaller than 1.5 mm, advantageously smaller than 1 mm, in particular comprised between 0.1 mm and 0.5 mm.

The part according to at least some embodiments of the invention may include one or more of the following features, considered alone or according to any technically possible combination(s):
- the surface density of perforations is greater than 20 perforations per square centimeter and is in particular comprised between 50 perforations per square centimeter and 600 perforations per square centimeter, in particular comprised between 50 perforations per square centimeter and 500 perforations per square centimeter;
- each perforation has a constant cross-section over its entire height through the surface layer;
- each perforation is formed by laser ablation;
- the resistance to the passage of air of the surface layer provided with the perforations is greater than 250 N·s/m$^3$, and is in particular comprised between 250 N·s/m$^3$ and 1000 N·s/m$^3$;
- the maximum thickness of the surface layer is less than 10% of the maximum thickness of the base body;
- the base body is a foam layer, in particular a polyurethane foam layer, the surface layer being a skin formed in one piece with the foam layer;
- the base body is a layer of felt, in particular a layer made up of a mixture of fibers chosen from among natural fibers and synthetic fibers, the surface layer being a film layer assembled on the felt layer.

The invention also relates to a method for manufacturing a soundproofing part for a motor vehicle, comprising the following steps:
- providing a base body made from foam or felt, a surface layer being applied on the base body, the surface layer being impermeable to the passage of air;

positioning the base body and the surface layer on a maintaining surface, the base body having shaping reliefs;

characterized by the following step:

producing, after arranging the base body and the surface layer on the maintaining surface, a plurality of through perforations through the surface layer, airtight passages being defined between the perforations, each perforation having a transverse dimension smaller than 1.5 mm, advantageously smaller than 1 mm, in particular comprised between 0.1 mm and 0.5 mm.

The method according to at least some embodiments of the invention may include one or more of the following features, considered alone or according to any technically possible combination(s):

the perforations are made by laser ablation;

the perforations are made while keeping the base body bearing on the maintaining surface;

the base body is a layer of foam, the method including a preliminary step for forming the base body and the surface layer by foaming of a precursor mixture in a foaming mold;

the foaming mold has a contact face with the surface layer, the contact layer being free of stripping agent that may react chemically with the precursor mixture, the base body is a layer of felt, the method including a prior step for assembling the surface layer made up of a layer of film on the layer of felt.

BRIEF DESCRIPTION OF THE SEVERAL VIEWS OF THE DRAWINGS

The invention will be better understood upon reading the following description, provided solely as an example and done in reference to the appended drawings, in which.

DETAILED DESCRIPTION OF THE ILLUSTRATED EMBODIMENTS

Figure 1:
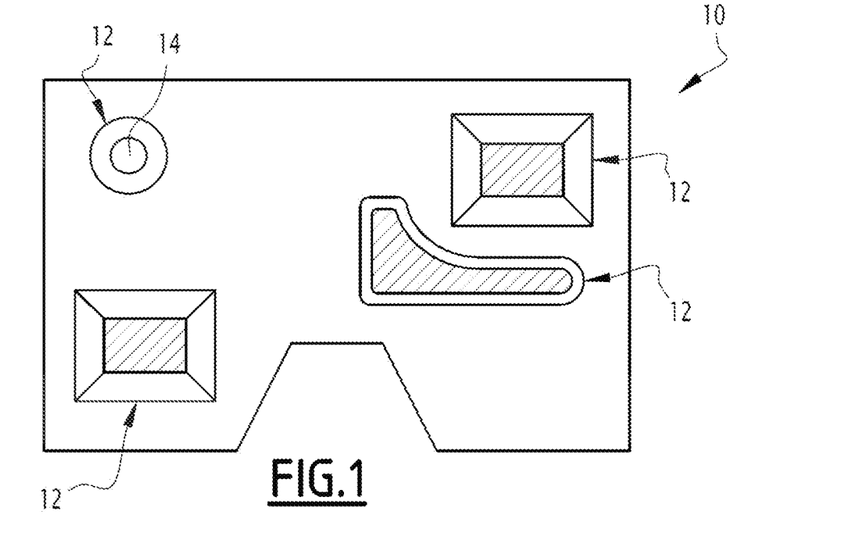
FIG. 1 is a top view of a first soundproofing part according to an embodiment of the invention comprising a foam base body.
Figure 2:
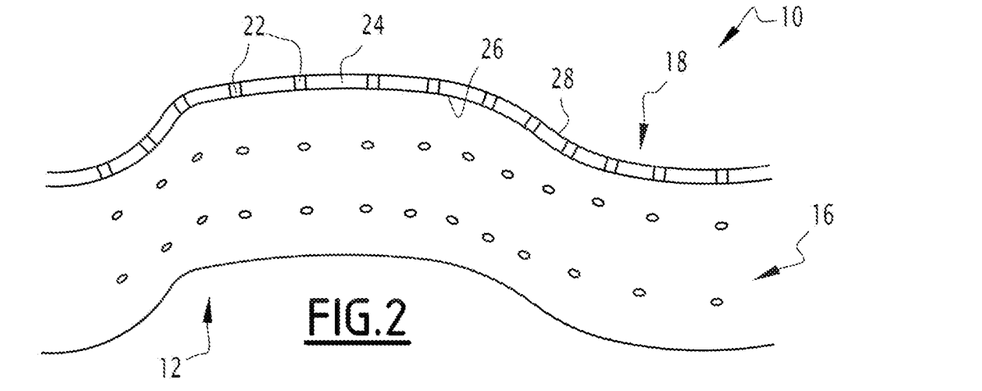
FIG. 2 is a sectional view of a detail of the part of FIG. 1.

A first soundproofing part 10 according to an embodiment of the invention is shown schematically in FIGS. 1 and 2.

The soundproofing part 10 is intended to be mounted inside a motor vehicle. In this example, the soundproofing part 10 forms a soundproofing assembly intended to be inserted between the passenger compartment of the vehicle and the engine compartment.

Alternatively, the soundproofing part 10 is intended to be placed on the floor of the motor vehicle, on a wheelhouse, or more generally, to be applied on the wall of the motor vehicle to perform soundproofing.

The soundproofing part 10 has shaping reliefs 12. These reliefs 12 are for example hollows and/or bosses arranged on an inner or outer face of the part 10, or near an opening 14 arranged in the part 10.

The hollows or the bosses for example respectively result from regions with smaller or greater thicknesses present in the part 10, or regions shaped on a surface during the manufacturing of the part 10.

The reliefs 12 are defined to adapt to the surface on which the part 10 is placed in the motor vehicle.

In reference to FIG. 2, the part 10 includes a base body 16 and at least one surface layer 18 applied on the base body 16.

In this example, the base body 16 is a layer of foam. The layer of foam is preferably a layer of open-cell foam.

Figure 4:
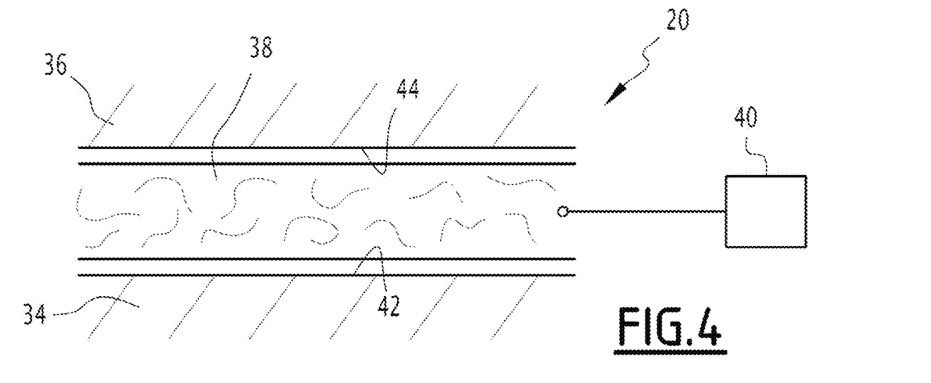
FIG. 4 is a schematic sectional view of a foaming mold during the formation of the foam base body of the part of FIG. 1.

It is for example produced by foaming from a precursor mixture in a foaming mold 20 shown schematically in FIG. 4.

The layer of foam is for example made from polyurethane. The polyurethane is obtained from a precursor mixture comprising an isocyanate and a polyol.

The thickness of the base body 16 is greater than that of the surface layer 18. The thickness of the base body 16 is for example greater than 5 mm and is in particular comprised between 5 mm and 15 mm.

The resistance to the passage of air of the base body 16 is lower than that of the surface layer 18. In this example, the resistance to the passage of air of the base body 16 is comprised between 100 N·s/m$^3$ and 300 N·s/m$^3$.

The resistance to air flow or its resistivity is measured using the method described in the thesis "Measurement of parameters characterizing a porous medium. Experimental study of the acoustic behavior of low-frequency foams.", Michel HENRY, defended Oct. 3, 1997 University of Mans.

In the example shown in FIGS. 1 and 2, the surface layer 18 is formed from the same material as the base body 16. Here, it is in a single piece with the base body 16.

The surface layer 18 thus forms a skin derived from the molding of the base body 16 in the foaming mold 20.

The maximum thickness of the surface layer 18 is less than 20% of the maximum thickness of the base body 16. This thickness is for example less than 1 mm and in particular comprised between 0.1 mm and 1 mm.

The surface layer 18 has a plurality of through perforations 22 arranged through the surface 18, and, between the perforation 22, airtight regions 24.

Each through perforation 22 emerges both in a contact face 26 of the surface layer 18, assembled on the base body 16, and in a face 28 opposite the contact face 26.

Each through perforation 22 has a maximum transverse dimension DT smaller than 1.5 mm, advantageously smaller than 1 mm, in particular comprised between 0.1 mm and 0.5 mm.

In this example, each through perforation 22 has a circular cross-section, the maximum transverse dimension DT of the through perforation 22 corresponding to the maximum diameter of the through perforation 22.

Alternatively, at least one through perforation 22 has a noncircular cross-section.

Advantageously, the cross-section of each through perforation 22 has a constant area between the contact face 26 and the opposite face 28.

As will be seen below, each through perforation 22 can be made by laser ablation using a perforation device 30, shown schematically in FIG. 5.

Figure 3:
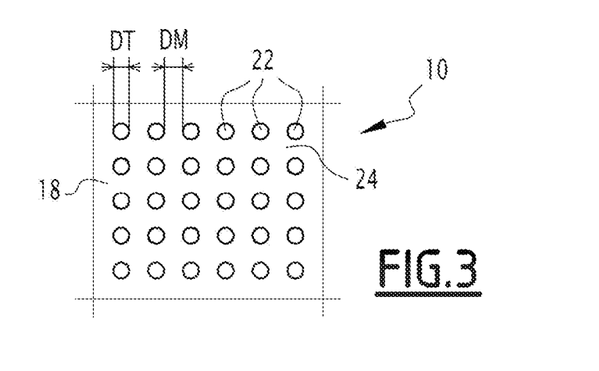
FIG. 3 is an enlarged top view of a detail of the part of FIG. 1.

The minimum distance DM separating two adjacent perforations 22 is smaller than 3 times the maximum transverse dimension DT of two adjacent perforations 22.

For example, the minimum distance DM is smaller than 0.5 mm and is comprised between 0.1 mm and 0.3 mm.

Thus, the surface density of perforations 22 in the surface layer 18 is greater than 20 perforations per square centimeter and is in particular comprised between 50 perforations per square centimeter and 600 perforations per square centimeter, advantageously between 50 perforations per square centimeter and 500 perforations per square centimeter.

In the example illustrated by FIG. 3, the perforations 22 are advantageously arranged in a regular geometric pattern, for example in the form of polygons, in particular square, to define rows and columns of perforations 22.

Thus, the resistance to the passage of air of the surface layer 18 provided with perforations 22 is greater than 110% of the resistance to the passage of air of the base body 16.

The resistance to the passage of air of the surface layer 18 provided with the perforations 22 is greater than 250 N·s/m$^3$, and is in particular comprised between 250 N·s/m$^3$ and 1000 N·s/m$^3$.

As will be seen below, the part 10 thus in this example forms a bipermeable complex made in one piece.

Figure 5:
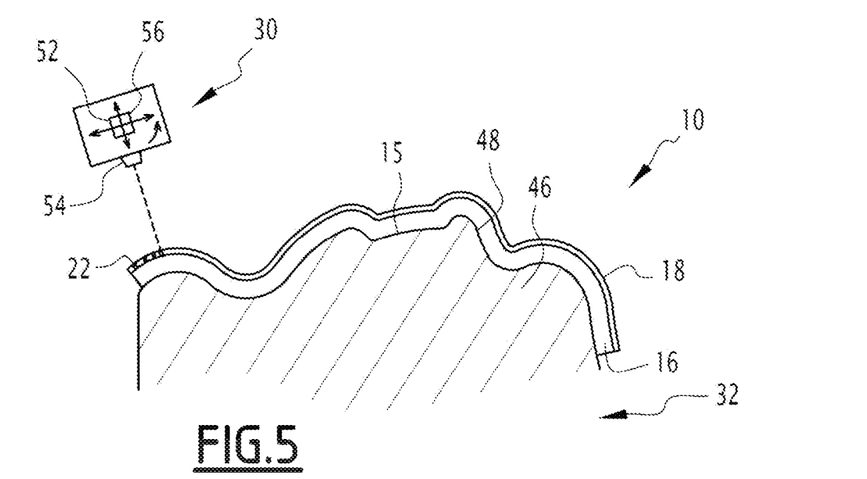
FIG. 5 is a schematic sectional view of a shaper of the part of FIG. 1, during the production of perforations in the surface layer.

The part 10 is manufactured in a facility comprising the foaming mold 20 illustrated schematically in FIG. 4, a shaper 32 defining a maintaining surface 15, illustrated schematically in FIG. 5, and the perforating device 30, also shown in FIG. 5.

The foaming mold 20 includes a first half-mold 34 and a second half-mold 36 defining a foaming cavity 38 between them. The foaming mold 20 includes an injection assembly 40 for injecting a foaming precursor mixture into the foaming cavity 38.

Each half-mold 34, 36 has a respective contact surface 42, 44 delimiting the foaming cavity 38.

The shaper 32 includes a die 46 defining, on the maintaining surface 15, reliefs 48 complementary to the reliefs 12 of the part 10.

The perforating device 30 includes a laser source 52, a focusing lens 54, and a relative positioning arrangement 56 of the device 30 with respect to the maintaining surface 15.

The laser source 52 is able to create a laser ray sent to the focusing lens 54. The focusing lens 54 is able to concentrate the emitted power on a chosen point located away from the device 30, at the surface layer 18.

The focusing lens 54 is able to be controlled in terms of power and position to perform a chosen and reproducible material ablation in the surface layer 18. This ablation creates each perforation 22 having the geometric characteristics defined above, while maintaining an airtight region 24 around each perforation 22.

The positioning arrangement 56 is able to move the focusing lens 54 relative to the maintaining surface 15 along at least two axes, and preferably along at least three axes, as well as to pivot the focusing lens 54 relative to the maintaining surface 15 along at least one axis, preferably along at least three axes.

Thus, the perforating device 30 is able to orient the laser ray applied on the surface layer 18, based on the local relief 12 present on this layer 18 when it is applied on the maintaining surface 15.

In particular, the perforating device 30 is able to maintain a chosen orientation of the laser ray relative to the normal to the surface layer 18 at the point of contact between the laser ray and the surface layer 18.

A method for manufacturing the soundproofing part 10 visible in FIGS. 1 and 2 will now be described.

Initially, a foam precursor mixture is introduced by the introducing assembly 40 into the foaming cavity 38 of the foaming mold 20.

The foaming mold 20 being closed, the precursor mixture fills the cavity 38 by foaming, to form the base body 16 after solidification.

In contact with surfaces 42, 44 of the respective half-molds 32, 34, a surface layer 18 forms from the same material as that making up the base body 16.

The surface layer 18 then has no perforations. It is preferably completely airtight.

No stripping agent able to react chemically with the precursor mixture is advantageously used in the foaming mold 20, which limits the emissions of volatile organic compounds to the strict minimum. The method is therefore implemented particularly safely.

The assembly formed in the foaming mold 20 is next removed from the mold 20 and brought onto the maintaining surface 15 of the shaper 32.

The assembly is placed in contact with the maintaining surface 15. The reliefs 12 of the part 10 marry the complementary reliefs 48 of the maintaining surface 15.

The perforating device 30 is brought across from the maintaining surface 15.

The base body 16 remaining pressed against the maintaining surface 15, the perforating device 30 is activated to arrange the through perforations 22 having the features defined above through the surface layer 18.

To that end, for each perforation 22 to be arranged, the positioning arrangement 56 is moved across from the point of the surface layer 18 on which the perforation 22 must be made and is oriented angularly relative to the normal to the surface layer 18. Then, the laser source 52 is activated, and the focusing lens 54 is adjusted to arrange the perforation 22 according to the desired characteristics.

The perforations 22 are therefore made with a high geometric precision, and according to the desired depth, owing to the precise adjustment of the focusing lens 54, without deteriorating the adjacent regions 24, which thus remain airtight.

The perforations are made by laser ablation at a very high speed, making it possible to sweep the entire part 10 in several tenths of a second. This corresponds to the time needed to mold to the part. The perforation operation is therefore done during hidden time.

This method makes it possible to obtain very precise characteristics in terms of resistance to the passage of air for the surface layer 18. These characteristics provide significantly improved sound absorption properties, through bipermeable effect.

Figure 6:
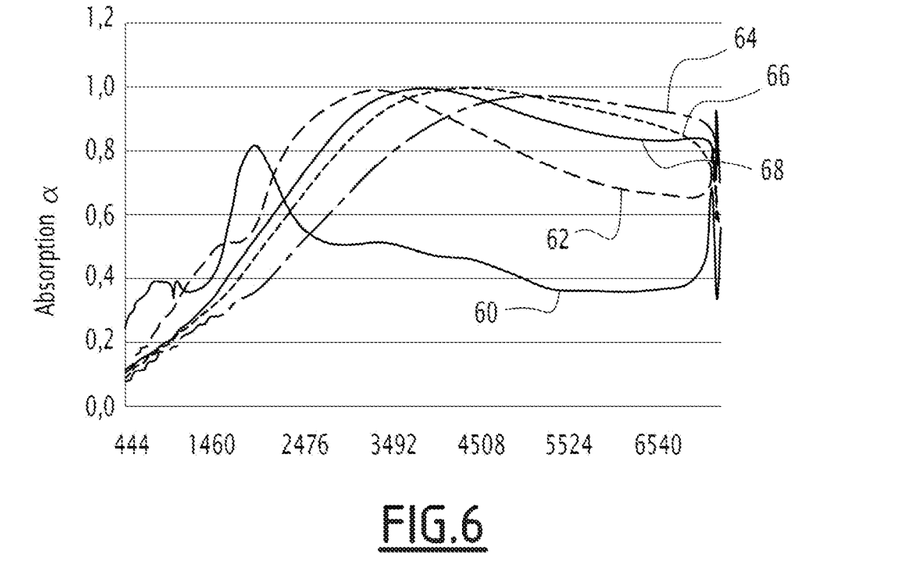
FIGS. 6 and 7 are curves showing the absorption as a function of the frequency for soundproofing parts according to an embodiment of the invention and according to the state of the art, respectively for two types of foam.

As an example, FIG. 6 illustrates the absorption curves as a function of frequency for different parts.

Curve 60 corresponds to a part of the state of the art, in which the surface layer 18 is completely tight. Likewise, curve 62 corresponds to a part of the state of the art, in which the surface layer 18 has been completely eliminated to keep only the base body 16.

Surprisingly, the curves 64, 66 and 68, which correspond to parts 10, with perforation diameters 22 respectively equal to 0.8 mm, 1 mm, 1.2 mm, have a very significantly improved acoustic absorption relative to the parts of the state of the art, even when the surface layer 18 has been completely removed.

Figure 7:
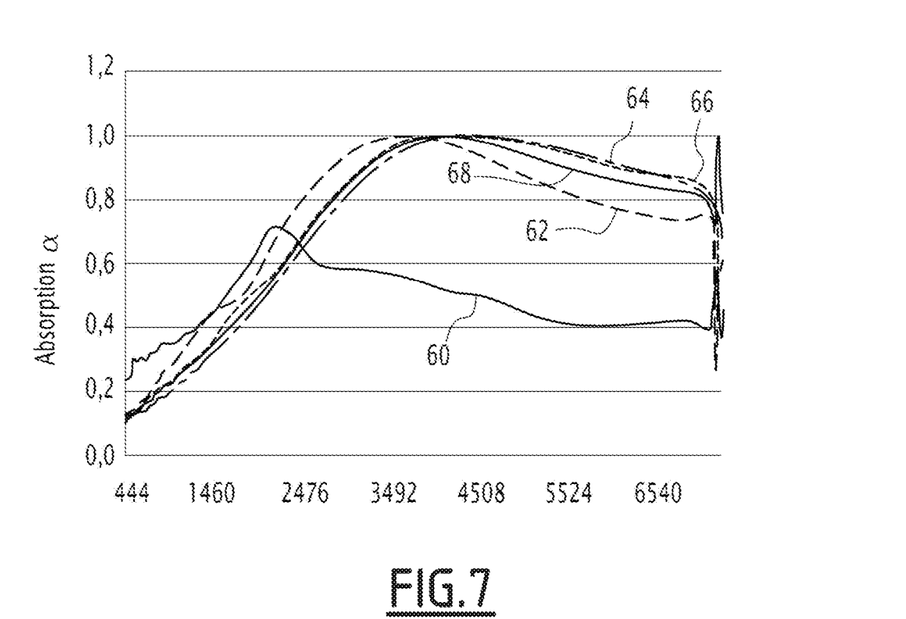

This can also be observed in FIG. 7, for another polyurethane foam making up the base body 16, which shows the same result.

Figure 8:
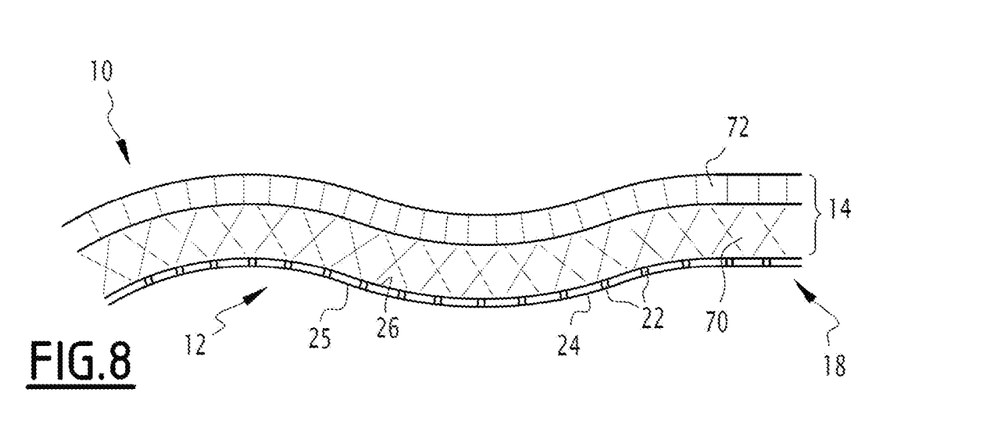
FIG. 8 is a view similar to FIG. 2, for a second soundproofing part according to an embodiment of the invention showing a felt base body.

In one alternative, illustrated by FIG. 8, the base body 16 includes at least one porous layer 70, 72, made from felt, and not foam. The base body 16 is in particular a carpet.

In this example, the base body 16 includes a porous layer 70 made from a base felt for example formed by "Airlaid" and passage in a hot air furnace. It also includes a felt decorative layer 72, for example made from needled felt.

Felts are for example made with a base of a mixture of natural fibers, such as cotton fibers, and synthetic fibers, such as polyolefin fibers, in particular polypropylene, and polyester fibers, in particular polyethylene terephthalate.

The surface layer 18 is made with a base of a continuous film assembled on the base body 16 for example by gluing using polyolefin powder, in particular polyethylene.

The film preferably has a thickness of less than 10% of the thickness of the base body 16. The thickness of the film is for example less than 50 micrometers and is generally comprised between 20 micrometers and 100 micrometers.

It has a surface density of less than 200 g/m2, in particular comprised between 20 g/m2 and 100 g/m2.

The film is made with a base of polypropylene, polyethylene or polyester terephthalate.

Like before, the film forming the surface layer 18 is provided with through perforations 22. It delimits airtight regions 24 between the perforations 22.

In this example, the resistance to the passage of air of the surface layer 18 formed by the film is greater than 250 N·s/m$^3$, and is in particular comprised between 500 N·s/m$^3$ and 1000 N·s/m$^3$.

To produce the part 10, the film forming the surface layer 18, initially provided without perforations 22, is assembled beforehand on a layer of felt 70. Then, the assembly formed by the base body 16 and the surface layer 18 is brought onto the maintaining surface 15.

Next, the perforating device 30 is brought across from the surface layer 18 and is activated, as previously described, to successively produce all of the perforations 22.

Surprisingly, the surface layer 18 formed by a simple film provided with perforations 22 has absorption properties similar to those of an absorbent carpet back side, with a significantly reduced surface density relative to such a back side.

Owing to the method described herein, however, the part 10 remains very easy to manufacture, and its acoustic properties can be adjusted by the size and surface density of perforations 22 made. The perforations 22 being made after shaping of the part 10, the risk of plugging of the perforations 22 is significantly decreased.

Figure 9:
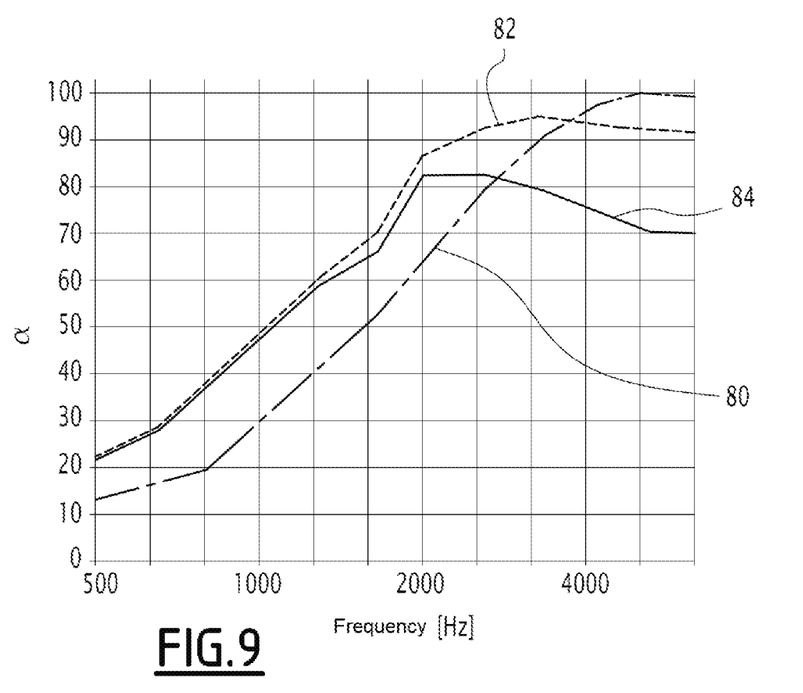
FIG. 9 shows curves similar to those of FIG. 6, for a soundproofing part according to an embodiment of the invention and parts according to the state of the art.

As an example, FIG. 9 illustrates the absorption curves as a function of frequency for different parts.

Curve 80 illustrates the absorption as a function of the frequency for a part of the state of the art including a base body 16 made from felt with a thickness of 15 mm and a surface density equal to 1200 g/m2. Curve 82 illustrates the absorption as a function of the frequency for another part including a base layer formed by a needled Dilour mat, a "Tritec"-type absorbent carpet with a surface density equal to 600 g/m2 applied on the base body 16 and a felt with a thickness of 15 mm and a surface density equal to 1200 g/m$^2$.

Curve 84 illustrates the absorption as a function of the frequency for a part according to an embodiment of the invention comprising a base layer 16 including a needled Dilour mat, a surface layer 18 made from perforated film applied on the base body 16 and a felt with a thickness of 15 mm and a surface density equal to 1200 g/m$^2$. The surface density of perforations is equal to 500 perforations per cm2 and the size of each perforation is 0.1 mm. The resistance to the passage of air of the surface layer 18 is then 500 N·s/m3.

Curves 82 and 84 show a significantly improved absorption in the low to medium frequencies, the part according to an embodiment of the invention being significantly lighter than those of the state of the art, since it does not include "Tritec" felt.

The invention claimed is:

1. A motor vehicle soundproofing part, including:
   a base body made from foam, the base body having shaping reliefs; and
   a surface layer, applied on the base body, the surface layer including a plurality of through perforations and airtight regions between the perforations, the surface layer being a skin formed in one piece with the base body;
   wherein each perforation has a transverse dimension smaller than 1.5 mm, and
   wherein the skin is derived from a molding of the base body in a foaming mold.

2. The part according to claim 1, wherein the surface density of perforations is greater than 20 perforations per square centimeter.

3. The part according to claim 1, wherein each perforation has a constant cross-section over its entire height through the surface layer.

4. The part according to claim 1, wherein each perforation is formed by laser ablation.

5. The part according to claim 1, wherein the resistance to the passage of air of the surface layer provided with the perforations is greater than 250 N·s/m$^3$.

6. The part according to claim 1, wherein the maximum thickness of the surface layer is less than 10% of the maximum thickness of the base body.

7. The part according to claim 1, wherein the transverse dimension is smaller than 1.5 mm.

8. The part according to claim 1, wherein the transverse dimension is comprised between 0.1 mm and 0.5 mm.

9. The part according to claim 1, wherein the surface density of perforations is comprised between 50 perforations per square centimeter and 600 perforations per square centimeter.

10. The part according to claim 1, wherein the surface density of perforations is comprised between 50 perforations per square centimeter and 500 perforations per square centimeter.

11. The part according to claim 1, wherein the resistance to the passage of air of the surface layer provided with the perforations is comprised between 250 N·s/m$^3$ and 1000 N·s/m$^3$.

12. The part according to claim 1, wherein the base body is a layer made up of a polyurethane foam layer.

13. The part of claim 1, wherein the surface layer is formed from the same material as the base body.

14. A method for manufacturing a motor vehicle soundproofing part, comprising the following steps:

providing a base body made from foam, a surface layer being applied on the base body, the surface layer being impermeable to the passage of air;

positioning the base body and the surface layer on a maintaining surface, the base body having shaping reliefs;

wherein the method comprises the following step:

producing, after arranging the base body and the surface layer on the maintaining surface, a plurality of through perforations through the surface layer, airtight regions being defined between the perforations, each perforation having a transverse dimension smaller than 1.5 mm, wherein the method includes a preliminary step for forming the base body and the surface layer by foaming of a precursor mixture in a foaming mold.

15. The method according to claim 14, wherein the perforations are made by laser ablation.

16. The method according to claim 14, wherein the perforations are made while keeping the base body bearing on the maintaining surface.

17. The method according to claim 14, wherein the foaming mold has a contact face with the surface layer, the contact layer being free of stripping agent that may react chemically with the precursor mixture.

18. A motor vehicle soundproofing part, including:

a base body made from felt, the base body having shaping reliefs; and a surface layer, applied on the base body, the surface layer including a plurality of through perforations and airtight regions between the perforations, the surface layer being film layer;

wherein each perforation has a transverse dimension smaller than 1.5 mm.

19. The part of claim 18, wherein the film layer is made with a base of polypropylene, polyethylene or polyester terephthalate.

* * * * *